United States Patent
Yamaguchi

(12) 
(10) Patent No.: US 6,500,558 B2
(45) Date of Patent: Dec. 31, 2002

(54) SURFACE-TREATED ALUMINUM MATERIAL WITH SUPERIOR ADHESIVE PROPERTIES AND PRODUCTION METHOD THEREFOR

(75) Inventor: Keitarou Yamaguchi, Susono (JP)

(73) Assignee: Mitsubishi Aluminum Co. Ltd., Tokyo (JP)

( * ) Notice: Subject to any disclaimer, the term of this patent is extended or adjusted under 35 U.S.C. 154(b) by 0 days.

(21) Appl. No.: 09/867,466

(22) Filed: May 31, 2001

(65) Prior Publication Data

US 2002/0009606 A1 Jan. 24, 2002

(30) Foreign Application Priority Data

May 31, 2000 (JP) ........................................ 2000-163621

(51) Int. Cl.$^7$ ............................ B32B 15/04; C25D 9/00
(52) U.S. Cl. ...................... 428/469; 205/316; 205/324; 205/325; 428/304.4; 428/318.4; 428/319.1; 428/319.3; 428/613; 428/689; 428/702; 428/704; 428/926; 428/935
(58) Field of Search ............................ 428/469, 304.4, 428/318.4, 319.1, 319.3, 613, 689, 702, 704, 926, 935; 205/316, 324, 325

(56) References Cited

U.S. PATENT DOCUMENTS 4,859,288 A * 8/1989 Furneaux et al. ........... 205/324
5,131,987 A * 7/1992 Nitowski et al. ........... 205/325

* cited by examiner

Primary Examiner—Robert R. Koehler
(74) Attorney, Agent, or Firm—Oblon, Spivak, McClelland, Maier & Neustadt, P.C.

(57) ABSTRACT

The present invention relates to an aluminum material to which a surface treatment is performed, and has as its objective the provision of a surface-treated aluminum material that has excellent adhesive properties with organic resin film. The present invention further aims to provide a method for producing the aforementioned. In the present invention's surface-treated aluminum material, a non-porous anodic oxide film is formed to the surface of the aluminum or aluminum alloy. This non-porous anodic oxide film has a thickness in the range of 5~800 nm, a porosity of 20% or less, and contains in an amount of 50 ppm or more at least one of silicon, phosphorous, boron or carbon as a component. As a result of this structure, the adhesive properties between organic resin film and non-porous anodic oxide film can be increased. Further, if the present invention's surface-treated aluminum material to which an organic resin film has been laminated is employed in various containers such as beverage cans, or in decorative boards used in furniture or interior construction materials, peeling will not occur when the material is subjected to further working. Moreover, corrosion does not occur even when the article is used over a long period of time, making it possible to obtain an article that demonstrates resistance to corrosion and excellent adherence properties with organic resin film.

19 Claims, No Drawings

SURFACE-TREATED ALUMINUM MATERIAL WITH SUPERIOR ADHESIVE PROPERTIES AND PRODUCTION METHOD THEREFOR

BACKGROUND OF THE INVENTION

1. Field of the Invention

The present invention relates to a surface-treated aluminum material employed in various containers like beverage cans, caps and food containers, as well as deep-drawing containers and decorative boards. More specifically, the present invention improves the adhesive properties between an organic resin film and an aluminum material in the case where the organic resin film is laminated onto the surface of the aluminum material.

This application is based on a patent application filed in Japan (Japanese Patent Application No. 2000-163621), the contents of which are incorporated herein by reference.

2. Background Art

It has been the conventional practice to employ a surface-treated aluminum material in various types of containers, such as beverage cans, as well as in decorative boards used in furniture or interior building materials in which a chromate-phosphate or chromate conversion coating is formed to the surface of an aluminum material, and an organic resin film is laminated to the surface of this chromate-phosphate or chromate conversion coating.

A surface-treated aluminum material employed in a beverage can must have strong adhesive properties so that the laminated organic resin film does not peel away from the aluminum surface when the material is worked into a can. Moreover, the surface-treated aluminum material must be resistant to the corrosive effects of the material within the can. Furthermore, a surface-treated aluminum material employed in a decorative boards or the like must also have excellent resistance to corrosion over long periods of time, and strong adhesive properties so that the laminated organic resin film does not peel away from the aluminum surface during drawing.

The method for producing these surface-treated aluminum materials will first be explained using as an example the surface-treated aluminum material employed in a beverage can.

Prior to producing the surface-treated aluminum material, aluminum or an aluminum alloy starting material is first subjected to pre-treating. This pre-treatment is performed in order to remove oil or grease adhering to the surface of the starting material, as well as remove any heterogeneous oxide film on the surface. A step using alkali washing or the like is employed.

Next, the aluminum or aluminum alloy starting material is soaked in a solution comprising mainly phosphoric acid, chromic acid and a fluoride, or a solution comprising mainly chromic acid and a fluoride. An amorphous film of chromate-phosphate or chromate in the form of a thin gel is formed to the surface of the aluminum starting material, thereby obtaining a surface-treated aluminum material with chromate conversion coating.

An organic resin film is then laminated to the surface of the aluminum material that was surface-treated with chromate-phosphate or the like. Two-layer film or the like is frequently employed as the organic resin film, this two-layer film having polyester and an adhesive layer formed by adding a third component to polyester to lower its melting point. This organic resin film is laminated to the surface of a chromate-phosphate film by adhering the low melting temperature adhesive layer. The film is passed through a roller that has been heated to a temperature above the melting point of the adhesive layer, to laminate the organic resin film, thereby obtaining the surface-treated aluminum material. This chromate-phosphate or chromate conversion coating makes it possible to increase the adhesion of the organic resin film to the surface-treated aluminum material.

The thus-obtained aluminum material onto which the organic resin film was laminated does not require coating of a processing lubricant when working the aluminum material. Thus can production costs can be reduced. Moreover, since the material inside the can does not come into direct contact with the aluminum, it is possible to prevent an aluminum odor from tainting the beverage. In addition, management of the treatment bath is easily accomplished for the chromate-phosphate treatment. Thus, working efficiency is high and continuous processing is possible. Accordingly, this process is wildly used.

However, conventional surface-treated aluminum materials in which an organic resin film is laminated over a chromate-phosphate or chromate conversion coating have not sufficient adhesive strength between the aluminum material and the organic resin film. This is because in an extremely thin organic resin film, molecules around the size of moisture that are in the air permeate the organic resin film over a long period of time, and reach the chromate coating. When moisture is present in the coating, this leads to a decrease in the adhesion between the chromate conversion coating and the organic resin film. In addition, the conventional chromate-phosphate or chromate conversion coating is a deposit so that there is low compression. As a result, moisture or corrosive impurities can remain within.

When heat is applied to laminate the organic resin film onto these coatings, the moisture or corrosive impurities in the film, but particularly the moisture, erupts and damages the adhesion between the organic resin film and the film.

The harmful qualities of chrome with respect to environmental contamination have been pointed out, so that use of chromium phosphate and chromium chromate is limited.

A titanium phosphate or zirconium phosphate base layer has been proposed as a non-chrome base treatment. However, when carrying out these base treatments, the adhesive strength between the aluminum material and the organic resin film was less than in the conventional art, and therefore did not provide satisfactory adhesive strength.

A method has also been proposed employing a porous anodic oxide film such as sulfate anodic oxide coating or phosphate anodic oxide coating that takes advantage of the anchoring effect of this porous anodic oxide film to adhere the aluminum material and the organic resin film. However, the diameter of the pores in the anodic oxide film is extremely small, so that the organic resin film does not enter into the pores to any great extent. Thus, a sufficient anchoring effect could not be obtained.

On the contrary, since the aforementioned anodic oxide film is porous, the area of joining with the organic resin film is small so that sufficient adhesive strength is not obtained. Further, moisture remains in the pores even in the case where a pore sealing treatment is performed on the anodic oxide film. Thus, the moisture in the pores erupts when the aluminum material is heated in laminating the organic resin film as described above. As a result, the adhesion between the organic resin film and the aluminum material is inhibited.

SUMMARY OF THE INVENTION

The present invention was conceived in view of the above-described circumstances and has as its objective the provision of a surface-treated aluminum material, and production method therefor, that is superior with respect to its adhesive properties with an organic resin film.

The present invention has as a further objective the provision of a surface-treated aluminum material and production method therefor in which the organic resin film is strongly laminated in place.

In order to resolve the above-described problems, a non-porous anodic oxide film is formed to the surface of the aluminum or aluminum alloy in the first surface-treated aluminum material according to the present invention. This non-porous anodic oxide film has a thickness in the range of 5~800 nm, a porosity of 20% or less, and contains in an amount of 50 ppm or more at least one of silicon, phosphorous, boron or carbon as a component.

It is possible to reduce the amount of moisture contained in the non-porous anodic oxide film by restricting the porosity thereof to be 20% or less. As a result, it is possible to control the amount of moisture erupted from these pores when heating in order to laminate the organic resin film to the surface. Thus, a fixed adhesion between the non-porous anodic oxide film and the organic resin film can be realized.

Further, the silicon, phosphorous, boron or carbon components included in the non-porous anodic oxide film is incorporated into the molecular structure of the organic resin film, thus promoting a strong adhesion between the non-porous anodic oxide film and the organic resin film.

In the present invention, it is preferable that the non-porous anodic oxide film includes silicon or phosphorous component in the amount of 50 ppm or more. These elements are readily incorporated into the molecular structure of the organic resin film as described above, so that a strong adhesion between the non-porous anodic oxide film and the organic resin film is easily achieved.

Specifically, silicon is highly effective in improving adhesive properties. It is preferable that the amount of silicon included is in the range of 100 ppm or more and 20,000 ppm or less.

In the present invention, the moisture content of the non-porous anodic oxide film is 20 wt % or less. When the moisture content of the non-porous anodic oxide film is 20 wt % or less, then it is possible to limit the reduction in adhesion between the organic resin film and the non-porous anodic oxide film due to moisture eruption during heating.

In general, the lower the porosity of the non-porous anodic oxide film, the lower the amount of moisture in the non-porous anodic oxide film. However, the moisture content of the non-porous anodic oxide film can also increase depending on the electrolyzing treatment conditions for forming the non-porous anodic oxide film. Thus, in order to realize a strong adhesion, the moisture content of the non-porous anodic oxide film is 20% or less.

Another aspect of the present invention is a surface-treated aluminum material in which an organic resin film is laminated to the surface of a surface-treated aluminum material as described above. The type of organic resin film for laminating is not particularly restricted. The method of adhesion is not particularly restricted, with thermocompression bonding and the use of adhesive agents being acceptable. Because the anodic oxide film, which serves as the base, is non-porous and has low moisture content, there is no damage from moisture erruption. In addition, chemical bonding between the organic resin film and the non-porous anodic oxide film is promoted via trace quantities of the elements silicon, phosphorous, boron and carbon. Thus, a surface-treated aluminum material is readily obtained in which the non-porous anodic oxide film and the organic resin film are strongly adhered.

A laminate film of polyethylene terephthalate derived resin and copolymer polyethylene terephthalate derived resin films are preferably employed as the organic resin film, for example.

In the present invention, a coating material may be applied to the surface of a surface-treated aluminum material as described above. The type of coating material is not particularly restricted. In this case, the silicon, phosphorous, boron, or carbon included in the non-porous anodic oxide film is also incorporated into the molecular structure of the coating material, thus promoting a strong adhesion between the non-porous anodic oxide film and the coating material.

In the method for producing the present invention's surface-treated aluminum material, aluminum or an aluminum alloy is subjected to electrolyzation in an electrolytic aqueous solution containing at least one salt selected from the group comprising silicate, phosphate, maleate, benzoate, phthalate, and borate, and a non-porous anodic oxide film is formed to the surface of the aluminum or aluminum alloy that contains a total of 50 ppm or more of at least one type from the group comprising silicon, phosphorous, boron or carbon and has a porosity of 20% or less.

By appropriately selecting the conditions under which the electrolyzation is performed in the electrolyzing aqueous solution containing an appropriate amount of silicon, phosphorous, boron or carbon, a anodic oxide film can be obtained that has a low porosity and contains 50 ppm or more of at least one type of trace component from the group comprising silicon, phosphorous, boron, or carbon. This non-porous anodic oxide film is characterized by its superior adhesive properties with organic resin film.

In another method for producing the present invention's surface-treated aluminum material, aluminum or an aluminum alloy is subjected to electrolyzation in an electrolytic aqueous solution containing at least one salt selected from the group comprising silicate, phosphate, maleate, benzoate, phthalate, and borate, and a non-porous anodic oxide film is formed to the surface of the aluminum or aluminum alloy that contains a total of 50 ppm or more of at least one type from the group comprising silicon, phosphorous, boron or carbon and has a porosity of 20% or less. This method, however, is provided with the step of then laminating the organic resin film to the surface of the aforementioned non-porous anodic oxide film.

In other words, this is a method for laminating the organic resin film after forming a non-porous anodic oxide film that has superior adhesive properties with the aforementioned organic resin film. As a result, a surface-treated aluminum material is obtained in which the organic resin film is strongly adhered in place. The organic resin film and adhesive method employed to laminate the organic resin film is not particularly restricted. Rather, a variety of resin films and adhesive methods may be suitably used. For example, an adhesive agent or primer may be coated to the non-porous anodic oxide film and pasting carried out.

In the present invention, thermocompression bonding may be used for adhering the organic resin film and the surface-treated aluminum material having the non-porous anodic oxide film. The non-porous anodic oxide film according to the present invention has good adhesion with the organic resin film, so that a strong adhesion can be easily accomplished with thermocompression bonding.

PREFERRED EMBODIMENTS OF THE PRESENT INVENTION

The present invention's surface-treated aluminum material will now be explained.

The substance employed as the aluminum starting material in the present invention is not particularly restricted. Namely, in addition to pure aluminum, a pure aluminum derived AA1000 alloy (JIS1000 alloy), Al—Mn derived AA3000 alloy (JIS3000 alloy), or an Al—Mg derived AA5000 alloy (JIS5000 alloy) may also be used for example. In addition, it is also acceptable to employ in these alloys a material that has been subjected to various thermal refining treatments such as solution treatment, aging or the like. Any type of rolled plate of these materials is preferably employed. In addition, clad metals of these aluminum alloy may also be used.

Next, a pre-treatment is performed to the aluminum material. This pre-treatment is not particularly restricted, and is for the purpose of removing heterogeneous oxide film from the surface of the aluminum starting material. For example, a method may be employed in which washing is carried out using a alkalescent degreasing solution, followed by alkaline etching in a sodium hydroxide aqueous solution and desmutting treatment in an aqueous solution of nitric acid. Alternatively, another acceptable method is one in which acid washing is carried out after washing using a degreasing solution.

Next, the pre-treated aluminum starting material is subjected to electrolyzation in the electrolytic solution, and anodizing process for forming the non-porous anodic oxide film to the surface of the aluminum starting material is carried out.

For the electrolytic solution, an electrolytic aqueous solution is employed containing an appropriate amount of silicon, phosphorous, boron or carbon, so that the solution does not readily dissolve the generated non-porous oxide film, and so that at least one element from the group comprising silicon, phosphorous, boron and carbon is incorporated in the non-porous oxide film in an amount of 50 ppm or more, and preferably 100 ppm or more.

To obtain this type of electrolytic aqueous solution, an appropriate amount of at least one type of salt from the group comprising silicate, phosphate, borate, maleate, benzoate, phthalate, adipate, tartrate, citrate, and malonate. The amount added will differ depending on the type of salt and the electrolyzing conditions, however, it is roughly in the range of 2~150 g/l. When the concentration of trace elements is high in the electrolytic aqueous solution, the concentration of trace elements incorporated into the non-porous oxide film also increases.

When the temperature of the electrolytic bath during the anodizing increases, the concentration of trace elements mentioned above that are incorporated into the non-porous anodic oxide film tends to increase. In addition, when the electric current density during the anodizing increases, the temperature of the electrolytic surface rises, and the concentration of trace elements incorporated in the non-porous anodic oxide film tends to increase. A suitable electrolytic concentration should be determined for each salt added based on these trends. The temperature of the electrolytic bath is in the range of 30° C.~60° C., the current density is in the range of 0.3~10 A/dm$^2$, and the applied voltage is in the range of 1.4~570 V. The electrolyzing conditions are appropriately set within these ranges, so that the porosity of the anodic oxide film is 20% or less, and preferably 10% or less, and the silicon, phosphorous, boron or carbon component contained in the anodic oxide film is in the amount of 50 ppm or more, and preferably 100 ppm or more. An important point to remember when carrying out the anodizing is to avoid formation of pores by gradually forming the anodic oxide film.

The thickness of the non-porous anodic oxide film is adjusted depending on the electrolyzing time, but is typically in the range of 5~800 nm, and preferably 50~200 nm.

The anodic oxide film obtained using this type of anodizing is a non-porous anodic oxide film of uniform thickness. A thickness in the range of 5~800 nm is acceptable for the non-porous anodic oxide film. When the film thickness is 5 nm or less, then this is about the thickness of the oxide film that naturally forms on the aluminum surface and resistance to corrosion cannot be obtained. On the other hand, when the thickness exceeds 800 nm, defects are readily generated in the film, so that the film is fractured and durability deteriorates. Accordingly, the thickness of the non-porous anodic oxide film is appropriately in the range of 5~800 nm, and preferably in the range of 50~200 nm.

It is acceptable for the non-porous anodic oxide film to have a degree of porosity that is 20% or less. Intermetallic compounds between aluminum and trace impurities such as silicon or iron are present on the surface of the aluminum or aluminum alloy. Since it is difficult to generate an anodic oxide film on top of these impurities, very small pores are generated in the anodic oxide film. Areas where these impurities are not exposed are essentially non-porous. In the anodic oxide film, it is acceptable if the pore surface area ratio, which is calculated by adding all the pores arising from these types of impurities, is 20% or less. Note that "20% or less" includes a pore surface area ratio of 0%. The degree of porosity of the non-porous anodic oxide film can be measured by enlarging the surface 100,000 fold using an electron microscope and examining the surface, and then calculating the surface area of the pores.

A non-porous anodic oxide film having few such pores has a low amount of impurities of a corrosive nature, chief among these being water, remaining in the pore. Thus, even when heating during the step to laminate the organic resin film to the surface of the non-porous anodic oxide film, there is no eruption of water from the surface of the anodic oxide film.

Further, in the case of a porous film such as sulfate anodic oxide film, when a pin hole occurs in the organic resin film, corrosive material can penetrate via the pin hole to the base aluminum material and corrode it. However, the present invention's non-porous anodic oxide film has high barrier properties, so that it is possible to avoid corrosion of the base aluminum starting material.

In addition, the moisture content of the present invention's non-porous anodic oxide film is less than 10%, and preferably 5% or less, for the film as a whole, with 2% or less being optimal. The moisture contained in the anodic oxide film erupts from the pore when heating during the step to laminate the organic resin film to the surface of the non-porous anodic oxide film, impairing the adhesive properties between the organic resin film and the anodic oxide film. For this reason, it is desirable that the moisture content of the non-porous anodic oxide film be extremely low. The moisture content of the non-porous anodic oxide film is the amount of moisture in the film as a whole, and comprises not only the moisture adhering to the surface, but also the moisture, which has permeated into deep areas within the pores and crystallization water.

The moisture content of the non-porous anodic oxide film is measured using a thermogravimetric method in which the film is heated to 500° C. and the decrease in mass is measured.

When the moisture content of the non-porous anodic oxide film exceeds 5%, the adhesive properties with organic resin film decrease. It is of course desirable that the moisture content of the non-porous anodic oxide film be 0%, however, it is difficult to actually achieve this value. Thus, there is no impairment to the film as long as the moisture content in the non-porous anodic oxide film is 5% or less, while a moisture content of 2% or less enables firmer adhesion between the anodic oxide film and the organic resin film.

It is acceptable for the present invention's non-porous anodic oxide film to contain in an amount of 50 ppm or more at least one of silicon (Si), phosphorus (P), boron (B) or carbon (C). Both a physical adhesive strength (chiefly from the anchoring effect) and a chemical adhesive strength (chemical bonds, H bonds, van der Waals forces) contribute to the strength of adhesion between the anodic oxide film and the organic resin film. It was discovered that chemical adhesive strength was promoted when Si, P, B or C was present in the anodic oxide film in an amount of 50 ppm or more. In order to promote this chemical adhesive strength, it is preferable to include the aforementioned Si, P, B or C in an amount of 50 ppm or more, and more preferably 100 ppm or more. From among the elements listed above, silicon (Si) and phosphorous (P) have a large effect, with the efficacy of silicon (Si) being particularly remarkable. For silicon (Si), there is a considerable effect when it is present in a range of 100 ppm or more to 20,000 ppm or less.

Further, the above-described effects can be obtained as long as P, B or C are contained in an amount of 50 ppm or higher. In particular, a marked efficacy is seen when P and B are in the range of 20,000 ppm or less and C is in the range of 50,000 ppm or less.

In order to obtain a non-porous anodic oxide film containing these components in an appropriate amount, an electrolytic solution containing these components in the appropriate amount as described above is used, the electrolyzing conditions are appropriately selected, and anodic oxidation is carried out.

In addition, an organic resin film is laminated to the surface of the aluminum material on which the non-porous anodic oxide film containing the above element in an appropriate amount is formed. The organic resin film used is not particularly restricted, with polyethylene (PE) resins, polyethylene terephthalate (PET) resins, polypropylene (PP) resins and polyamide resins (nylon, etc.) being applicable. It is acceptable to employ a laminated polyethylene terephthalate resin film with a copolymer polyethylene terephthalate resin film in which the melting point is lowered by copolymerizing a third component with polyethylene terephthalate resin. The adhesive method is not particularly restricted, with thermocompression bonding or employment of an adhesive agent being acceptable.

The laminating treatment is not particularly restricted. For example, a suitable resin film may be prepared and closely contact to the non-porous anodic oxide film formed of the surface-treated aluminum material having the non-porous anodic oxide film that was obtained by the method described above. This laminate is then passed through a roller that has been heated to a temperature above the melting point of the organic resin film, and the organic resin film is laminated to the anodic oxide film. The pressure applied to the roller, etc. is appropriately determined based on the material and thickness of the organic resin film.

In the thus-obtained surface-treated aluminum material onto which the organic resin film is laminated, the aluminum starting material and the organic resin film are adhered in place. As a result, even when the material undergoes further processing, the organic resin film does not peel away. In addition, since the non-porous anodic oxide film is present at the base of the organic resin film, the barrier property is excellent and resistance to corrosion does not deteriorate over time. As a result, the present invention's surface-treated aluminum material can be widely employed in various containers, chief among these being beverage cans, caps, and food containers, as well as deep-drawing containers and decorative boards.

Effects of the Invention

It is the objective of the present invention to promote adhesive strength when laminating an organic resin film by taking advantage of the low porosity and moisture content in a non-porous anodic oxide film obtained by an anodic oxidation treatment under specific conditions. Moreover, the present invention promotes adhesion between the non-porous anodic oxide film and the organic resin film by including elements that readily give rise to specific chemical compounds in a non-porous anodic oxide film.

PREFERRED EMBODIMENTS OF THE PRESENT INVENTION

Preferred embodiments of the present invention and comparative examples therefor will now be explained.

An Al—Mg derived AA5052 (JIS5052) plate rolled to a thickness of 1.0 mm was prepared for use as the aluminum alloy material. This aluminum alloy material was soaked for 60 seconds in a 50° C. degreasing bath containing 2% surface-active agent, and then washed for 30 seconds. Next, etching was performed for 30 seconds at 50° C. in a 10% NaOH aqueous solution, followed by washing for 30 seconds. Thereafter, the plate was washed for 30 seconds in a 10% $HNO_3$ solution, followed by washing for 30 seconds.

Next, using an aqueous solution containing the salts listed in Table 1 as the electrolytic solution, electrolyzation was performed using the aluminum alloy as the anode. The concentration of the salt in the electrolytic solution was 2~10%, the temperature of the electrolytic bath was in the range of 30° C.~60° C., the electrolytic voltage was in the range of 1.4~530 V, and the current density was in the range of 2~4 $A/dm^2$. By suitably adjusting these ranges, anodic oxide films having the thickness shown in Table 1 were formed to the aluminum alloy surface.

The porosity, moisture content, and amount of Si, P, B and C contained were measured for each test anodic oxide film.

The degree of porosity was observed by enlarging the anodic oxide film surface 100,000 fold using an electron microscope, and determining the surface area of the pores. The moisture content was determined by using a thermogravimetric method to measure the reduction in mass due to release of crystallization water when heating the aluminum material on which a specific anodic oxide film was formed to 500° C. The reduction in mass of the aluminum material on which an anodic oxide film was not formed was measured and corrected for, thereby deriving the moisture content of the anodic oxide film.

The Si, P, B and C components were measured using element analysis while etching the film with glow-discharge mass spectrometry (GD-MASS spectrometry). The results of these measurements are also shown in Table 1.

Adhesive strength was evaluated by laminating an organic resin film to the surface of the aluminum alloy material provided with the anodic oxide film described above. The evaluation of adhesive strength was carried out using two methods.

The first method (A) employs a two-layer film consisting of polyethylene terephthalate resin (PET resin) and copolymer polyethylene terephthalate resin (copolymer PET resin) having an adhesive layer in which the melting point has been lowered by copolymerizing a third component to the polyethylene terephthalate resin (PET resin). The thickness of the two-layer film was 15 µm.

This two-layer film was placed onto the surface of the aluminum alloy provided with the aforementioned anodic oxide film, and passed through a thermal roller that was heated to a temperature above the melting point of the adhesive layer. The adhesive layer was melted as a result, thermal adhering to the anodic oxide film on the surface of the aluminum material.

Next, the surface-treated aluminum material to which this two-layer film was laminated was cut into 10 mm×50 mm size pieces. These pieces were soaked for 7 days in warm water at a temperature of 50° C., and then removed. The aluminum starting material alone was immediately ruptured to the portion of the aluminum material by applying notches at non-laminated side in the longitudinal center of the piece.

Then, the PET resin film was pulled in a direction in which the film would peel off, and the degree of separation of the PET resin film was evaluated. The symbol "○" was used to indicate a material in which no peeling occurred, the symbol "Δ" was used to indicate a material in which peeling was 3 mm or less, and the symbol "X" was used to indicate a material in which peeling exceeded 3 mm.

In the second method (B), an epoxy resin derived adhesive agent was coated to a thickness of 1 g/m$^2$ to the surface of an aluminum alloy that was provided with an anodic oxide film. A 15 µm thick PET resin film was stacked on top, and passed through a nip roller heated to 150° C. The assembly was then placed in a 180° C. electric furnace for 3 minutes and completely adhered together. Next, as in the case of the first method, the surface-treated aluminum material to which this PET resin was laminated was cut into 10 mm×50 mm size pieces. These pieces were soaked for 7 days in warm water at a temperature of 50° C., and then removed. The aluminum starting material alone was immediately ruptured to the portion of the aluminum material by applying notches at non-laminated side in the longitudinal center of the piece. Then, the PET resin film was pulled in a direction in which the film would peel off, and the separation of the PET resin film was evaluated. The symbol "○" was used to indicate a material in which no peeling occurred, the symbol "Δ" was used to indicate a material in which peeling was 3 mm or less, and the symbol "X" was used to indicate a material in which peeling exceeded 3 mm.

These results of these evaluations are shown in Table 1.

TABLE 1

| No. | film thickness (nm) | porosity (%) | moisture content (%) | film components components/ (content ratio) (ppm) | salt used | evaluation of adhesive property Method A | Method B |
|---|---|---|---|---|---|---|---|
| EXAMPLES | | | | | | | |
| 1 | 50 | 1 | 0.5 | P/200 | phosphate | ○ | ○ |
| 2 | 300 | 1 | 0.5 | B/1,500 | borate | ○ | ○ |
| 3 | 500 | 1 | 0.5 | B/2,800 | borate | ○ | ○ |
| 4 | 200 | 0.1 | 0.1 | C/2,500 | maleate | ○ | ○ |
| 5 | 200 | 3 | 1.0 | Si/2,500 | silicate | ○ | ○ |
| 6 | 300 | 18 | 4.5 | P/1,200 | phosphate | Δ | ○ |
| 7 | 160 | 0.5 | 0.7 | Si/1,200 | silicate | ○ | ○ |
| 8 | 150 | 0.5 | 0.7 | Si/100 | silicate | ○ | ○ |
| 9 | 150 | 0.5 | 0.5 | Si/60 | silicate | ○ | ○ |
| 10 | 250 | 1 | 0.5 | B/1,500 P/300 | borate phosphate | ○ | ○ |
| 11 | 500 | 1 | 0.5 | B/2,800 C/120 | borate benzoate | ○ | ○ |
| 12 | 200 | 0.1 | 0.1 | B/2,800 P/200 | phthalate phosphate | ○ | ○ |
| 13 | 300 | 11 | 10 | P/5,000 | phosphate | Δ | ○ |
| 14 | 750 | 1 | 9 | B/5,000 | borate | Δ | Δ |
| 15 | 280 | 3 | 2 | Si/16,000 | silicate | ○ | ○ |
| 16 | 310 | 2 | 2 | C/42,000 | benzoate | Δ | ○ |
| 17 | 710 | 5 | 5 | B/19,000 | borate | ○ | ○ |
| 18 | 290 | 5 | 8 | P/16,000 | phosphate | ○ | ○ |
| 19 | 350 | 7 | 9 | Si/24,000 | silicate | Δ | ○ |
| COMP EX | | | | | | | |
| 1 | 2 | 1 | 0.3 | B/300 | borate | × | × |
| 2 | 6 | 0.5 | 0.1 | B/20 | borate | × | Δ |
| 3 | 8 | 0.5 | 0.1 | P/35 | phosphate | × | Δ |
| 4 | 120 | 0.5 | 0.3 | Si/40 | silicate | × | Δ |
| 5 | 860 | 18 | 16 | B/12,000 | borate | × | × |
| 6 | 790 | 32 | 25 | B/16,000 | borate | × | × |
| 7 | 20 | 18 | 15 | Si, P, B, C < 10 | hydrogen peroxide | × | × |

As shown in Table 1, the adhesive properties of the aluminum material and the PET resin film were excellent in the case of Examples 1 through 19 which satisfied the requirements of the present invention. The surface-treated aluminum material in these examples all had a film thickness in the range of 5~800 nm, a porosity of 20% or less, and contained one or more of Si, P, B and C.

With respect to moisture content, materials having a moisture content of 2% or less (Examples 1~5, Examples 7~12, and Example 15) demonstrate excellent adhesive properties. When the moisture content exceeds 2% but is 20% or less (Examples 6, 13, and 14), the adhesive properties are slightly poorer as compared to the case where the moisture content is 2% or less.

With respect to the Si, P, and B content, the amount of these elements contained in the surface-treated aluminum material in the Examples was in the range of 50 ppm or more to 20,000 ppm or less. The material in all of these examples demonstrated sufficient adhesive properties. Further, with respect to the C content, the amount of this element contained in the surface-treated aluminum material in the Examples was in the range of 50 ppm or more to 50,000 ppm or less. The material in all of these examples demonstrated sufficient adhesive properties.

Next, a comparison of Example 6 and Example 13 reveals that despite having a lower porosity than Example 6, Example 13 has higher moisture content and demonstrated slightly poorer adhesive properties between the PET resin film and the aluminum material. This is because the electrolyzation temperature was high in Example 13, so that even if porosity was low, moisture content increased.

In Example 14, the film was slightly too thick, so that moisture in the film increased. As a result, a slightly poorer result was obtained for the adhesive properties between the aluminum material and the PET resin film.

Example 19 contained Si in excess of 20,000 ppm, so that slightly poorer adhesive properties were seen as compared to examples in which the Si content was 20,000 or less.

The films were too thin in Comparative Example 1. As a result, it was not possible to reach the point where the effects of the non-porous anodic oxide film influenced adhesive properties. In addition, the concentration of Si, B, and P in the non-porous anodic oxide film in Comparative Examples 2~4 was low, at less than 50 ppm. Thus, no improvement in adhesive properties was achieved.

The film was too thick at 860 nm in Comparative Example 5. Thus the moisture content was high and the adhesive properties between the aluminum member and the PET resin film was poor.

In Comparative Example 6, porosity was a high 32% and the moisture content was again high. Comparative Example 6 demonstrated poor adhesive properties between the aluminum material and the PET resin film.

Comparative Example 7 employed hydrogen peroxide as the electrolytic solution. As a result, the concentrations of Si, P, B and C were all 10 ppm or less and the adhesive properties between the aluminum member and the PET resin film was poor.

Industrial Field of Applicability

In the present invention's surface-treated aluminum material having a non-porous anodic oxide film, a non-porous anodic oxide film is formed to the surface of the aluminum or aluminum alloy. The thickness of the non-porous anodic oxide film is it the range of 5~800 nm, has a porosity of 20% or less, and contains at least one of silicon, phosphorus, boron or carbon in an amount of 50 ppm or more. As a result, it is possible to increase its ability to adhere to organic resin films. In addition, if the present invention's surface-treated aluminum material having an organic resin film laminated thereto is employed in various containers such as beverage cans, or decorative boards used in furniture or interior construction materials, peeling does not occur when these materials are subjected to further working. Further, corrosion of these materials does not occur even when they are used over long periods of time, enabling provision of an article that demonstrates resistance to corrosion and excellent adherence properties with organic resin film.

In the present invention's method for producing a surface treated aluminum material, it is possible to readily provide a surface-treated aluminum material with excellent adhesive properties with organic resin film, by selecting the appropriate electrolytic conditions. In addition, it is possible to provide a surface-treated aluminum material in which the organic resin film is strongly adhered.

Note that the present invention may be executed in various other forms without departing from the main characteristics thereof. The preceding Embodiments are merely examples and should not be interpreted restrictively. The limits of the present invention are described in the claims and are not restricted by the specification. Finally, the present invention's claims include all variations and alterations falling within the limits thereof.

What is claimed:

1. A surface-treated aluminum material, comprising a non-porous anodic oxide film formed at the surface of an aluminum or an aluminum alloy, wherein the thickness of the non-porous anodic oxide film is in the range of 5~800 nm, the porosity of the non-porous anodic oxide film is at most 20%, and the surface-treated aluminum material contains at least 50 ppm of at least one member selected from the group consisting of silicon, phosphorus, boron, and carbon.

2. The surface-treated aluminum material according to claim 1, wherein the non-porous anodic oxide film contains at least 50 ppm of at least one member selected from the group consisting of silicon and phosphorus.

3. The surface-treated aluminum material according to claim 2, wherein the non-porous anodic oxide film contains from 100 to 20,000 ppm of silicon.

4. The surface-treated aluminum material according to claim 3, wherein the nonporous anodic oxide film contains at most 20 wt % of moisture.

5. The surface-treated aluminum material according to claim 2, wherein the nonporous anodic oxide film contains at most 20 wt % of moisture.

6. The surface-treated aluminum material according to claim 1, wherein the non-porous anodic oxide film contains from 100 to 20,000 ppm of silicon.

7. The surface-treated aluminum material according to claim 6, wherein the nonporous anodic oxide film contains at most 20 wt % of moisture.

8. The surface-treated aluminum material according to claim 1, wherein the nonporous anodic oxide film contains at most 20 wt % of moisture.

9. The surface-treated aluminum material according to any one of claims 1 through 8, further comprising an organic resin film, wherein the organic resin film is laminated to the surface of the non-porous anodic oxide film.

10. The surface-treated aluminum material according to claim 9, wherein the organic resin film is a laminate film comprising a polyethylene terephthalate resin film and a copolymer polyethylene terephthalate resin film.

11. The surface-treated aluminum material according to any one of claims 1 through 8, further comprising a coating material, wherein the coating material is applied to the surface of the non-porous anodic oxide film.

12. A method of producing a surface-treated aluminum material, comprising:

electrolyzing an aluminum or aluminum alloy in an electrolytic aqueous solution containing at least one salt selected from the group consisting of silicate, phosphate, maleate, benzoate, borate, and phthalate; and forming a nonporous anodic oxide film to the surface of the aluminum or aluminum alloy wherein the nonporous anodic oxide film contains at least 50 ppm of at least one member selected from the group consisting of silicon, phosphorous, boron, and carbon (C) and the nonporous anodic oxide film has a porosity of at most 20%.

13. The method according to claim 12, further comprising removing a heterogeneous oxide film from the surface of the aluminum or aluminum alloy prior to electrolyzing the aluminum or aluminum alloy.

14. The method according to claim 12, wherein the electrolyzing of the aluminum or aluminum alloy is conducted at a temperature from 30° C. to 60° C.

15. A method of producing a surface-treated aluminum material, comprising:

electrolyzing aluminum or aluminum alloy in an electrolytic aqueous solution containing at least one salt selected from the group consisting of silicate, phosphate, maleate, benzoate, borate, and phthalate;

forming a nonporous anodic oxide film to the surface of the aluminum or aluminum alloy wherein the nonporous anodic oxide film contains at least 50 ppm of at least one member selected from the group consisting of silicon, phosphorous, boron, and carbon (C) and the nonporous anodic oxide film has a porosity of at most 20%; and laminating an organic resin film is to the surface of the non-porous anodic oxide film.

16. The method according to claim 15, wherein the laminating of the organic resin film to the surface of the non-porous anodic oxide film is carried out by thermal bonding.

17. The method according to claim 15, wherein the laminating of the organic resin film to the surface of the non-porous anodic oxide film is carried out in the presence of an adhesive agent.

18. The method according to claim 15, further comprising removing a heterogeneous oxide film from the surface of the aluminum or aluminum alloy prior to electrolyzing the aluminum or aluminum alloy.

19. The method according to claim 15, wherein the electrolyzing of the aluminum or aluminum alloy is conducted at a temperature of from 30° C. to 60° C.

* * * * *